May 4, 1937. C. B. FOOS 2,079,500

ELECTRICAL CONTROL CIRCUIT

Filed March 29, 1934

Inventor:
Caldwell B. Foos,
by Harry E. Dunham
His Attorney.

Patented May 4, 1937

2,079,500

UNITED STATES PATENT OFFICE 2,079,500

ELECTRICAL CONTROL CIRCUIT

Caldwell B. Foos, Schenectady, N. Y., assignor to General Electric Company, a corporation of New York Application March 29, 1934, Serial No. 717,979

11 Claims. (Cl. 175—363)

My invention relates to electrical control circuits and more particularly to improvements in control circuits for electric discharge devices and electrical regulating systems.

The present invention is a modification of the invention which is disclosed and broadly claimed in an application of O. W. Livingston, Serial No. 718,094, filed March 29, 1934, and assigned to the assignee of the present application. The invention disclosed in the above identified application of O. W. Livingston relates broadly to arrangements for producing a control potential which varies in accordance with the larger of a plurality of relatively variable unidirectional potentials. The apparatus he discloses makes use of electric discharge, or vacuum tube, means having a plurality of anode-cathode conducting paths, and the apparatus is shown as used in an automatic regulating circuit for battery charging service.

In accordance with my invention, I am enabled to secure substantially the same results as are obtained with the arrangement including the plurality of anode-cathode paths of Livingston with the use of but a single anode-cathode vacuum tube conducting path, or more broadly, with the use of but a simple unidirectional conducting device of any suitable one of the many well known types of such devices. Consequently, my circuit is simpler and less expensive than the Livingston circuit.

An object of my invention is to provide a new and improved electrical control circuit.

Another object of my invention is to provide a new and improved electrical control circuit for electric discharge devices.

A further object of my invention is to provide a new and improved electrical regulating system.

My invention will be better understood from the following description, taken in connection with the accompanying drawing, and its scope will be pointed out in the appended claims.

Figure 1:
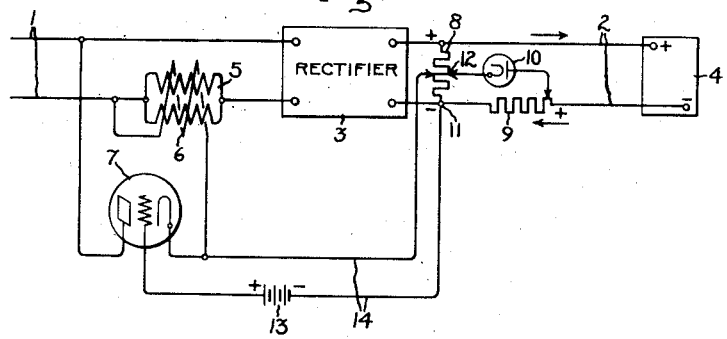
Figure 2:
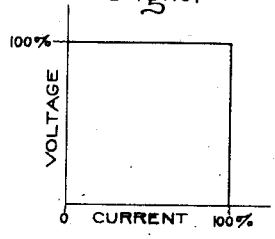
Figure 3:
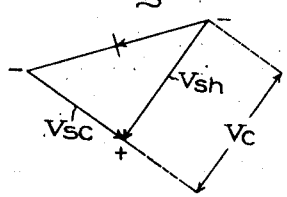

In the drawing, Fig. 1 is a diagrammatic showing of an automatic regulating circuit for battery charging circuits which embodies my invention; Fig. 2 shows the regulated characteristics of the circuit of Fig. 1; and Fig. 3 is a diagrammatic illustration of a modification of my invention.

In Fig. 1 I have shown an electric translating circuit comprising an alternating current supply circuit 1, which is arranged to energize a direct current load circuit 2 through a rectifier 3, which may be of any suitable type. The direct current load circuit 2 is arranged to supply energy to any suitable load, such as a storage battery 4 which is to be charged. Connected in the supply circuit 1 for controlling the current and voltage of the load circuit 2 is a control device in the form of a saturable reactor 5. This reactor is provided with a direct current saturating winding 6 which may be energized in any suitable manner and as shown is connected to be energized from the supply circuit 1 through a controlled rectifier in the form of a three electrode electric discharge device or electric valve 7 which may be of any one of the types which are well known in the art, although I prefer to use a valve of the vapor electric discharge type because of its greater current carrying capacity and efficiency.

For controlling the conductivity of valve 7, and hence for controlling the saturation of reactor 5, I provide a special control circuit consisting of a shunt resistor 8 connected across the direct current load circuit 2, a series resistor 9 connected in the direct current load circuit 2, and a unidirectional conducting element 10 having an anode and a cathode connected between points on the resistors 8 and 9. The series resistor 9 is connected in the load circuit 2 in such a way that the polarity of the end thereof which is electrically most adjacent an end of the shunt resistor 8 is of the same polarity as that end of the shunt resistor 8. Consequently, resistors 8 and 9 have a common polarity equipotential point 11, which, for the directions of current flow and polarity marked on the drawing, is negative with respect to the other ends of the resistors. The unidirectional conducting device 10 is connected between a point 12 on the shunt resistor which is normally more positive with respect to the point 11 than is the point on the series resistor 9 to which the element 10 is connected. In addition, the direction of non-conductivity of the element 10 is such as to block the normal tendency of current to flow from the more positive potential point to the point of lower potential.

A control voltage for the regulating system is obtained from between points 11 and 12 on the shunt resistor 8 and in order to have a suitable reference standard against which the regulating system may regulate, I provide, by way of example, any suitable source of constant potential, such, for example, as a grid bias battery 13 which is connected in a grid control circuit 14 in opposition to the potential drop between the points 11 and 12 on shunt resistor 8. As shown, the point 12 is connected to the cathode of the tube 7 while the positive terminal of the bias battery 13 is connected to the grid of the tube 7.

In operation, the circuit of Fig. 1 produces a regulator characteristic, such as is shown in Fig. 2. That is to say, over a given range of the current in circuit 2, which is designated as a range between zero and 100% current, the voltage of the circuit is maintained substantially constant at 100% representing the voltage value which is normal for the circuit. However, if the current tends to exceed the 100% or maximum allowable value, the regulating system automatically limits the current to this value by reducing the circuit voltage from 100% normal value to zero, if necessary.

The way Fig. 1 operates to accomplish the above result is as follows: By means of the adjustable connections of the circuit 14 and the unidirectional conducting element to the shunt resistor 8, the point 12 is so located that for normal voltage on the direct current circuit 2 the voltage drop between points 11 and 12 is exactly equal and opposite to the potential of the bias battery 13. Also the connection point of the unidirectional conducting element 10 to the series resistor 9 is so adjusted that the potential drop between this point and point 11 is equal to the potential drop between points 11 and 12 when 100% current flows in the load circuit 2. With these adjustments, and assuming that the translating circuit is in normal operation and the alternating current supply circuit 1 is supplying current to the battery 4 through the rectifier 3 at a value which is somewhere between zero and 100% value, the system will automatically maintain 100% voltage in the following manner: Should the voltage of circuit 2 tend to drop below the 100% value, the potential between points 11 and 12 will become less than the potential of battery 13 with the result that the grid of tube 7 becomes positive with respect to its cathode, thereby rendering this tube conductive during alternate positive half cycles of anode potential with the result that rectified direct current flows in the saturating winding 6 of the reactor thereby decreasing the impedance of this device and reducing the voltage drop across it with the result that the voltage of circuit 2 increases. As soon as the voltage of circuit 2 exceeds the normal, or 100% value, the voltage drop between points 11 and 12 on the shunt resistor 8 exceeds the potential of bias battery 13 thereby rendering the grid of tube 7 negative with respect to its cathode, whereby this tube becomes non-conductive with the result that no saturating current flows in the direct current winding of the reactor, thereby greatly increasing the voltage drop across this device and reducing the voltage of the direct current load circuit 2, whereupon the cycle is repeated. The above described operation is very rapid and results in the holding of an average direct current voltage which is equal to the normal 100% value.

If now the current in circuit 2 should tend to exceed the 100% value due, for example, to the connection of a badly discharged battery to the load circuit, the potential drop across the series resistor 9 will, by reason of the previously described adjustment, become greater than the voltage drop between the points 11 and 12 on the shunt resistor with the result that current will tend to flow through the unidirectional conducting element 10, thereby raising the potential of point 12 with respect to point 11 above the value corresponding to 100% voltage. However, as previously explained, whenever the potential points 12 exceeds the potential point 11, by a value which is greater than the potential of battery 13, the voltage of circuit 2 is lowered. Consequently, whenever the current in circuit 2 tends to exceed the 100% value the voltage of this circuit is immediately lowered until the current drops below this 100% value. As it is the potential of the circuit which causes the current flow therein, it will be seen that the current in circuit 2 cannot substantially exceed the 100% value at any time.

It should of course be understood that Fig. 2 represents an ideal regulation characteristic and that due to the characteristics of saturable reactors, it is not possible to obtain an exactly rectangular characteristic such as is shown in Fig. 2. However, this circuit illustrates the general shape of the characteristic of the regulating system. It should also be understood that Fig. 1 is a greatly simplified diagrammatic showing, for purposes of clearly illustrating the principles of my invention, and that for actual commercial applications of my invention, numerous well known refinements would normally be added, such for example, as suitable filters for the grid control circuit 14 for insuring uniformity of the direct current potential applied thereto from the load circuit 2, suitable amplifiers if necessary between the circuit 14 and the winding 6, etc.

My invention is also subject to modification. Thus, while in Fig. 1 the common point of the relatively variable potential producing resistors 8 and 9 is negative with respect to the other terminals of these devices, this is not necessarily always desirable, and as shown in Fig. 3, if desired the positive terminals of these devices may be connected to a common point and their negative terminals interconnected by a unidirectional conducting element in such a manner as to block the normal flow of current. In Fig. 3 $V_{sh}$ may be taken to represent the voltage of the shunt resistor 8, while $V_{sc}$ may be taken to represent the voltage of the series resistor 9, while $V_c$ represents the control voltage applied to the grid circuit 14.

While I have shown and described particular embodiments of my invention it will be obvious to those skilled in the art that changes and modifications may be made without departing from my invention and I, therefore aim in the appended claims to cover all such changes and modifications as fall within the true spirit and scope of my invention.

What I claim as new and desire to secure by Letters Patent of the United States, is:

1. In combination, separate devices each for producing one of a pair of relatively variable unidirectional control potentials, a unidirectional conducting element having an anode and a cathode, a circuit including said devices and the anode and cathode of said element with the potentials of said devices in opposition, and control means connected to be responsive to the potential of one of said devices which is normally of higher potential than the other.

2. In combination, a device for producing a variable unidirectional potential, another device for producing a variable unidirectional potential which is normally less than said first mentioned potential, and means for combining said devices so as to produce a single potential which is proportional to the greater of said potentials which comprises connecting corresponding polarities of said devices together and connecting a unidirectional conducting element in series with the device having the normally smaller of said two potentials with the direction of non-conductivity of said element blocking a flow of current from the device at the normally higher potential into the other of said devices.

3. In combination, separate devices each for producing one of a pair of relatively variable unidirectional potentials of which one is normally greater than the other, a unidirectional conducting element, a circuit including said devices and said element in series with the potentials of said devices in opposition and the direction of non-conductivity of said element blocking the normal tendency for current to flow from the device normally producing the greater potential into the device normally producing the lesser potential, and a control circuit connected to be responsive to the potential of one of the device normally producing the greater potential.

4. In a combination, separate devices each for producing one of a pair of variable unidirectional control potentials of which one is normally but not continuously greater than the other, a unidirectional conducting element, a series circuit including said devices and said element with the polarities of said devices in opposition and with the direction of non-conductivity of said element blocking the normal tendency of current to flow from the normally higher to the normally lower potential device, and a voltage responsive control circuit connected across said normally higher potential device whereby said control circuit will also be responsive to the potential of said normally lower potential device when its potential exceeds the potential of said normally higher potential device as a result of the conductivity of said element during such time.

5. In combination, a direct current circuit, a pair of resistors connected respectively across said circuit and in series therewith, said resistors having a common polarity connection point, a pair of points on said respective resistors of which one is normally at a greater potential difference from said common point than the other, a unidirectional conducting device connected between said pair of points with its direction of non-conductivity blocking a flow of current from the normally relatively higher to the normally relatively lower potential point of said pair, and an electro-responsive device connected between said common polarity connection point and the one of said pair of points normally at the greater potential difference from said common point.

6. In combination, a direct current circuit, a pair of resistors connected respectively across said circuit and in series therewith, said resistors having a common polarity connection point, a pair of points on said respective resistors of which one is normally at a greater potential difference from said common point than the other, a unidirectional conducting device connected between said pair of points with its direction of non-conductivity blocking a flow of current from the normally relatively higher to the normally relatively lower potential point of said pair, regulating means for said circuit, and means for deriving a control potential for said regulating means from between said common polarity point and the one of said pair of points normally at the greater potential difference from said common polarity point.

7. In combination, an alternating current supply circuit, a direct current load circuit, a rectifier interconnecting said circuits, a saturable reactor in said alternating current circuit, a shunt resistor connected across said load circuit, a series resistor connected in said load circuit electrically adjacent said shunt resistor so that said resistors have a common equipotential point which is of the same polarity with respect to the other ends of said resistors, a unidirectional conducting element connecting a point on said shunt resistor with a point on said series resistor which is normally at a less potential difference from said common point than said first mentioned point on said shunt resistor, the direction of non-conductivity of said element being such as to block the normal tendency of current to flow between said two last mentioned points, a source of substantially constant unidirectional potential, a control circuit responsive to the difference between the potential of said source and the potential drop in said shunt resistor between said two points thereon, and means including said saturable reactor responsive to said control circuit for regulating the voltage and current of said direct current load circuit.

8. In combination, an alternating current supply circuit, a direct current load circuit, a rectifier interconnecting said circuits, a saturable reactor in said alternating current circuit, a shunt resistor connected across said load circuit, a series resistor connected in said load circuit electrically adjacent said shunt resistor so that said resistors have a common equipotential point which is also of the same polarity with respect to the other ends of said resistors, a unidirectional conducting element connecting a point on said shunt resistor with a point on said series resistor which is normally at a less potential difference from said common point than said first mentioned point on said shunt resistor, the direction of non-conductivity of said element being such as to block the normal tendency of current to flow between said two last mentioned points, a source of substantially constant unidirectional potential, a control circuit responsive to the difference between the potential of said source and the potential drop in said shunt resistor between said two points thereon, a saturable reactor in said supply circuit, an electric discharge device for varying the saturation of said reactor, and means responsive to the potential of said control circuit for controlling said electric discharge device.

9. In combination, an electric discharge device having a control electrode, and means for controlling the conductivity of said discharge device comprising separate devices each for producing one of a pair of relatively variable unidirectional control potentials, a unidirectional conducting element, a circuit including said devices and said element with the potentials of said devices in opposition, said control electrode being connected in a circuit to be energized in accordance with the potential of one of said separate devices which is normally of higher potential than the other.

10. In combination, an electric discharge device having a control electrode, and means for controlling the conductivity of said device comprising separate devices each for producing one of a pair of relatively variable unidirectional potentials of which one is normally greater than the other, a unidirectional conducting element, a circuit including said devices and said element in series with the potentials of said devices in opposition and the direction of non-conductivity of said element blocking the normal tendency for current to flow from the device normally producing the greater potential into the device normally producing the lesser potential, said control electrode being connected in a circuit to be energized in accordance with the potential of one of said separate devices which is normally of higher potential than the other.

11. In combination, an electric discharge device having a control electrode, and means for controlling the conductivity of said discharge device comprising, a direct current circuit, a pair of resistors connected respectively across said circuit and in series therewith, said resistors having a common polarity connection point, a pair of points on said respective resistors of which one is normally at a greater potential difference from said common point than the other, a unidirectional conducting device connected between said pair of points, the direction of non-conductivity blocking a flow of current from the normally relatively higher to the normally relatively lower potential point of said pair, said control electrode being connected in a circuit to be energized in accordance with the potential between said common polarity point and the one of said pair of points normally at the greater potential difference from said common polarity point.

CALDWELL B. FOOS.